(Model.) 9 Sheets—Sheet 2.

J. F. SEIBERLING.
GRAIN BINDING HARVESTER.

No. 269,332. Patented Dec. 19, 1882.

WITNESSES
Franck L. Ousand
R. M. Smith

INVENTOR
John F. Seiberling
by A. M. Smith
Attorney (Model.)
9 Sheets—Sheet 3.
J. F. SEIBERLING.
GRAIN BINDING HARVESTER.
No. 269,332. Patented Dec. 19, 1882.
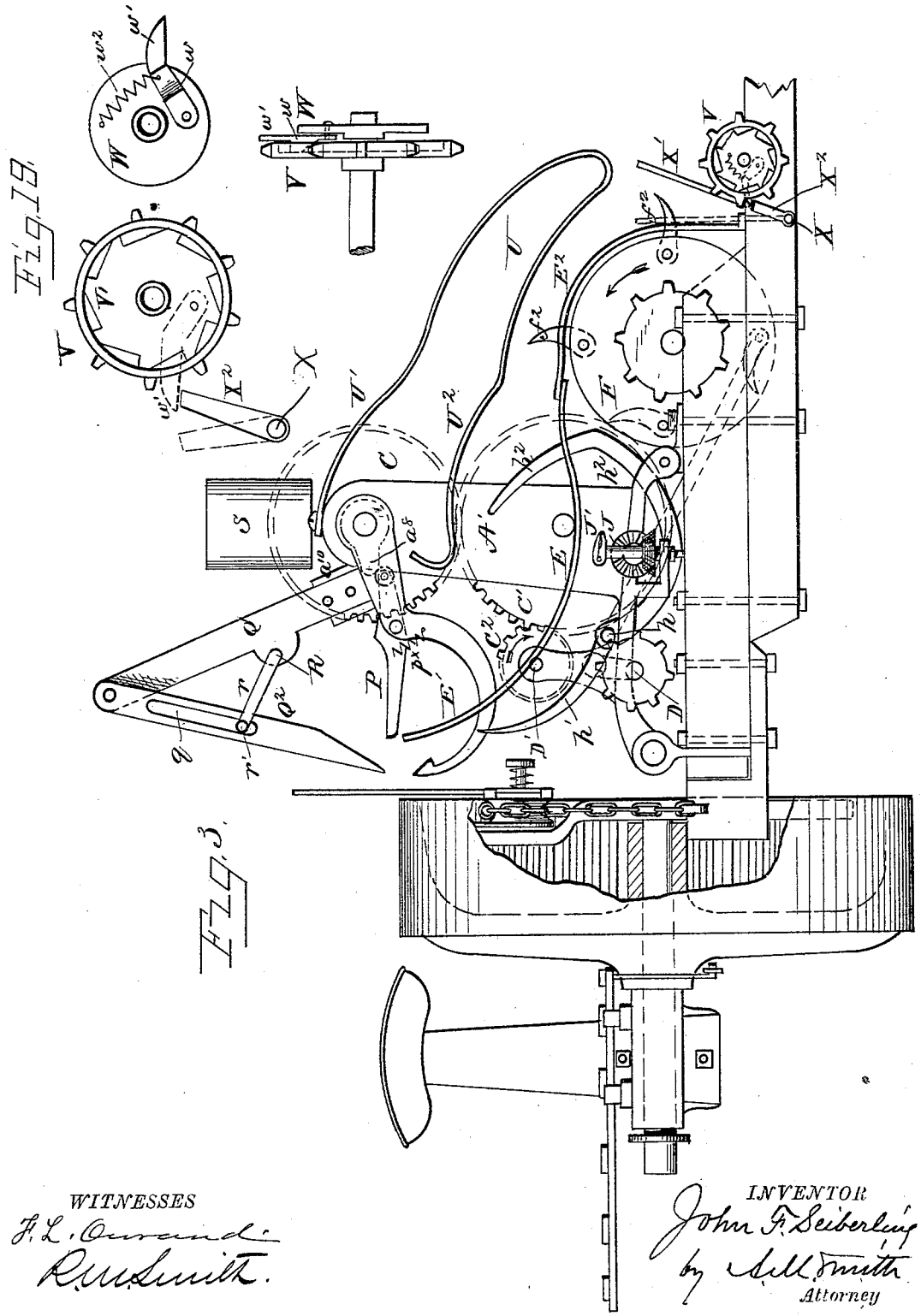
WITNESSES
INVENTOR
John F. Seiberling
by All Smith
Attorney

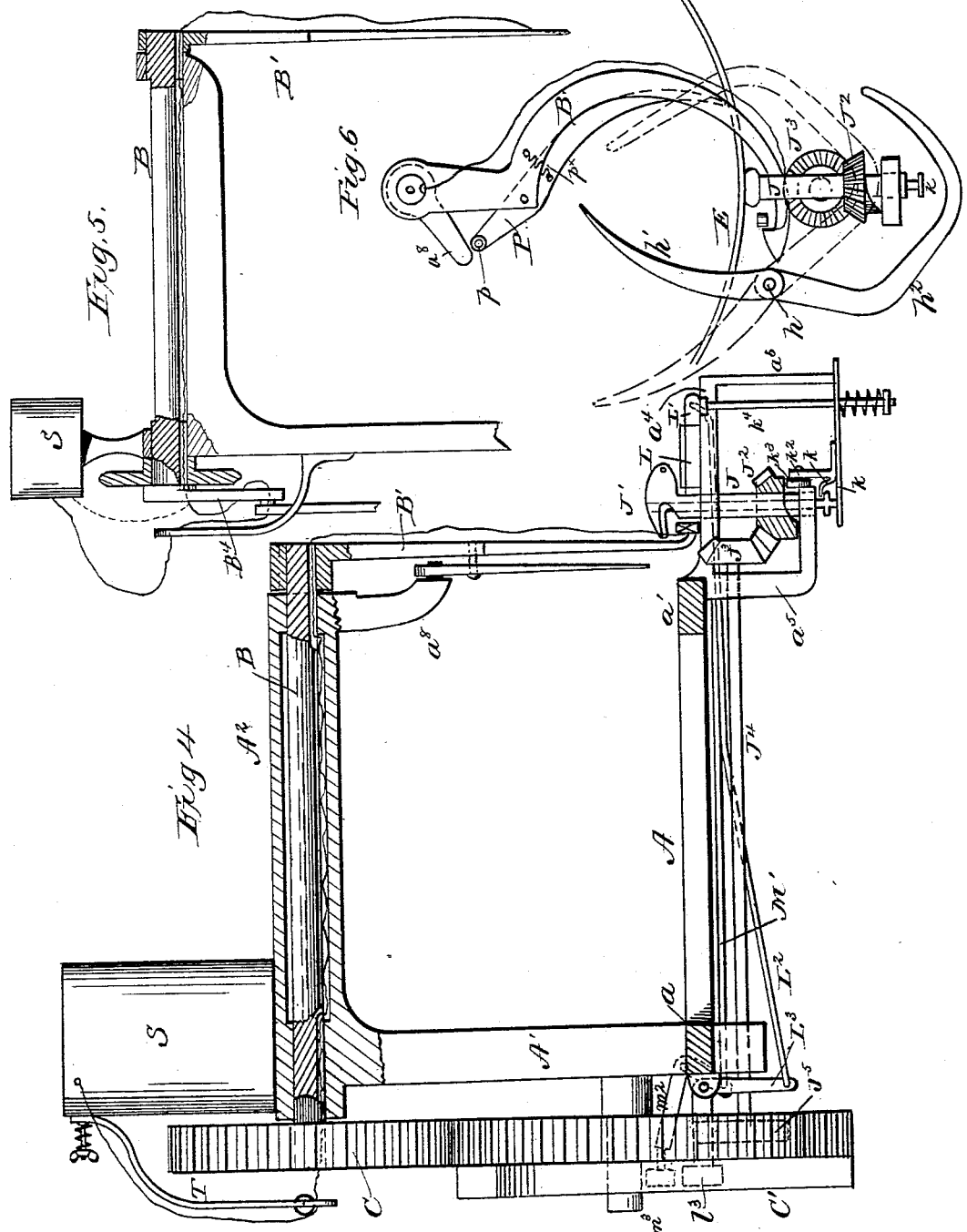

(Model.)

J. F. SEIBERLING.
GRAIN BINDING HARVESTER.

No. 269,332. Patented Dec. 19, 1882.

WITNESSES
F. L. Ourand
R. W. Smith

INVENTOR
John F. Seiberling
by A. L. Smith
Attorney (Model.)

J. F. SEIBERLING.

GRAIN BINDING HARVESTER.

No. 269,332.

9 Sheets—Sheet 6.

Patented Dec. 19, 1882.

WITNESSES
F. L. Durand
R. W. Smith

INVENTOR
John F. Seiberling
by A. L. Smith
Attorney (Model.)
J. F. SEIBERLING.
GRAIN BINDING HARVESTER.
No. 269,332. Patented Dec. 19, 1882.
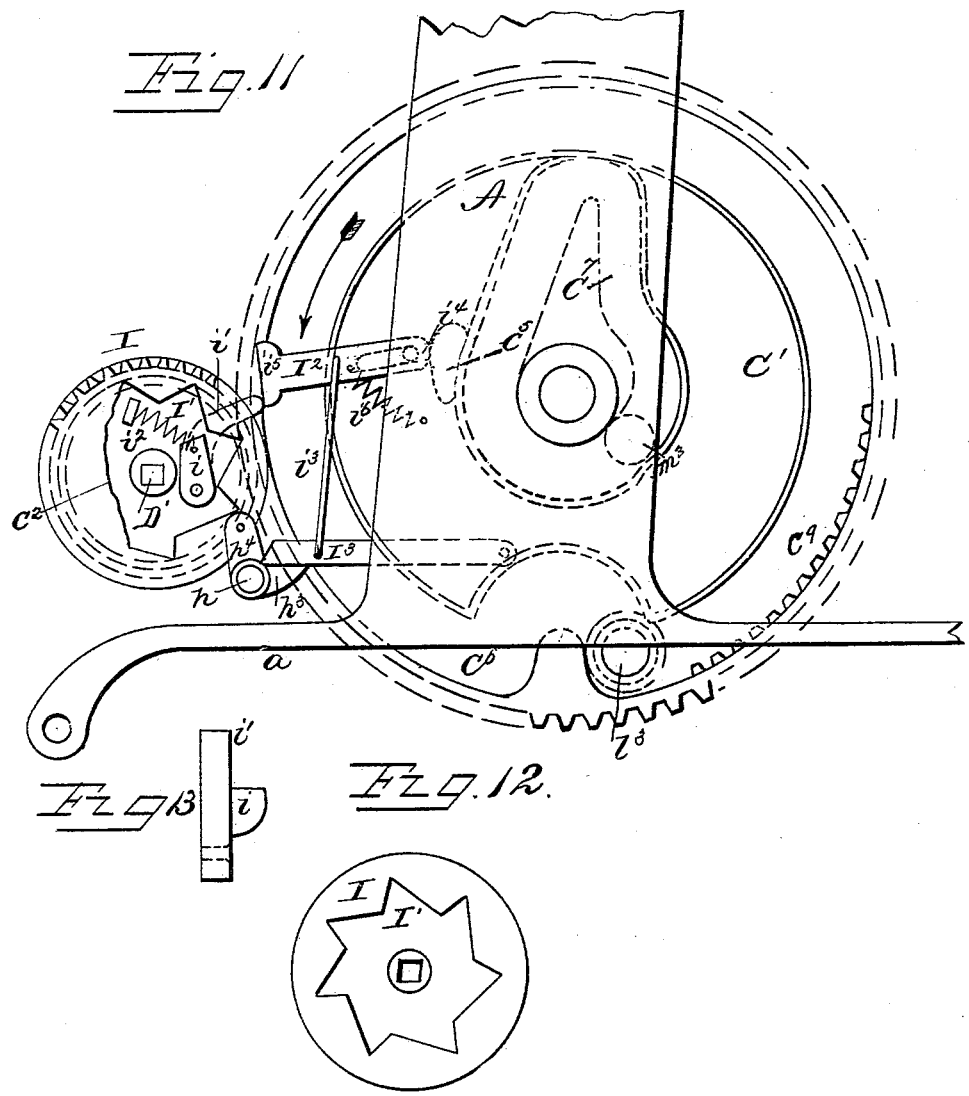
WITNESSES
F. L. Ourand.
R. W. Smith.
INVENTOR
John F. Seiberling
by Sill Smith
Attorney (Model.)
9 Sheets—Sheet 8.
J. F. SEIBERLING.
GRAIN BINDING HARVESTER.
No. 269,332. Patented Dec. 19, 1882.
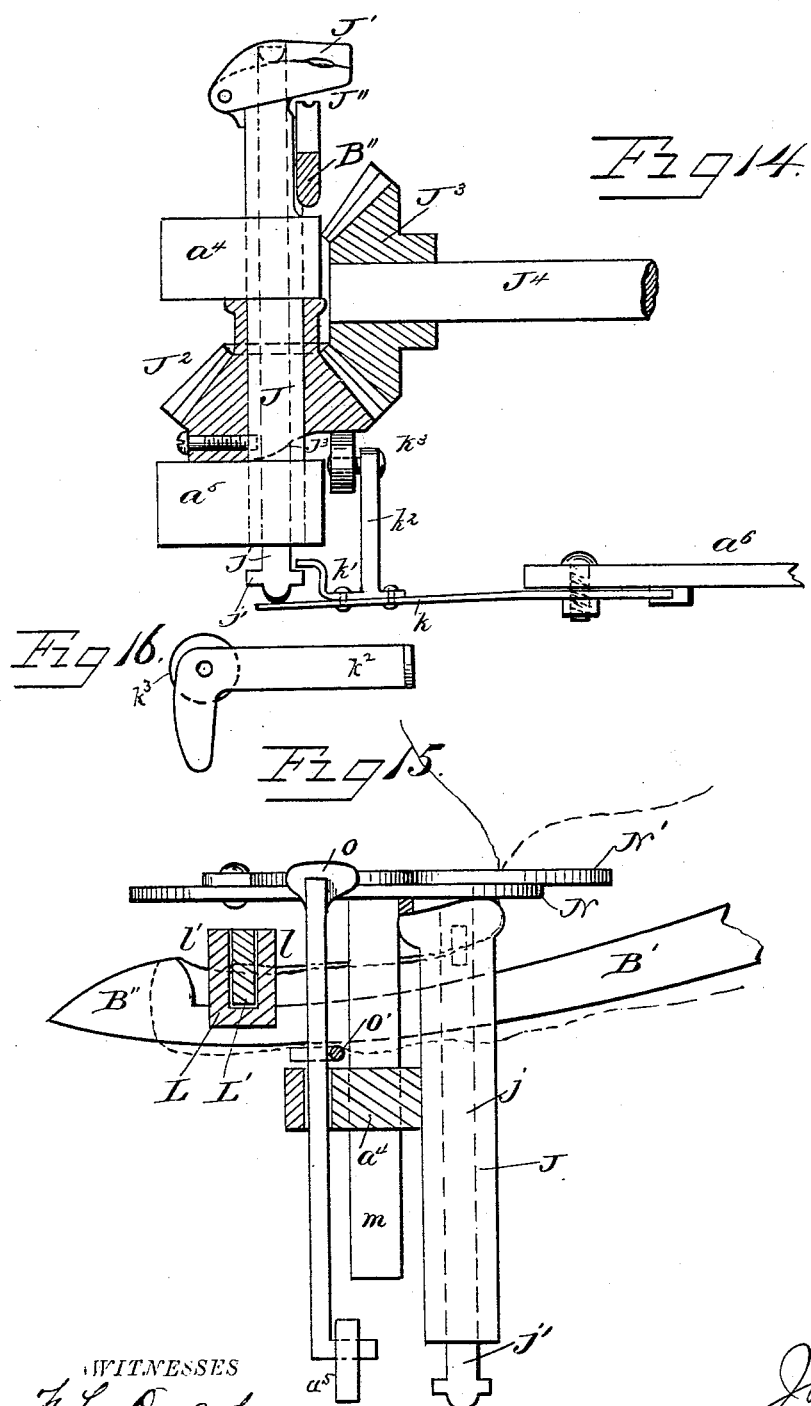
WITNESSES
INVENTOR
John F. Seiberling
by Sill. Smith
Attorney (Model.)
9 Sheets—Sheet 9.
J. F. SEIBERLING.
GRAIN BINDING HARVESTER.
No. 269,332. Patented Dec. 19, 1882.
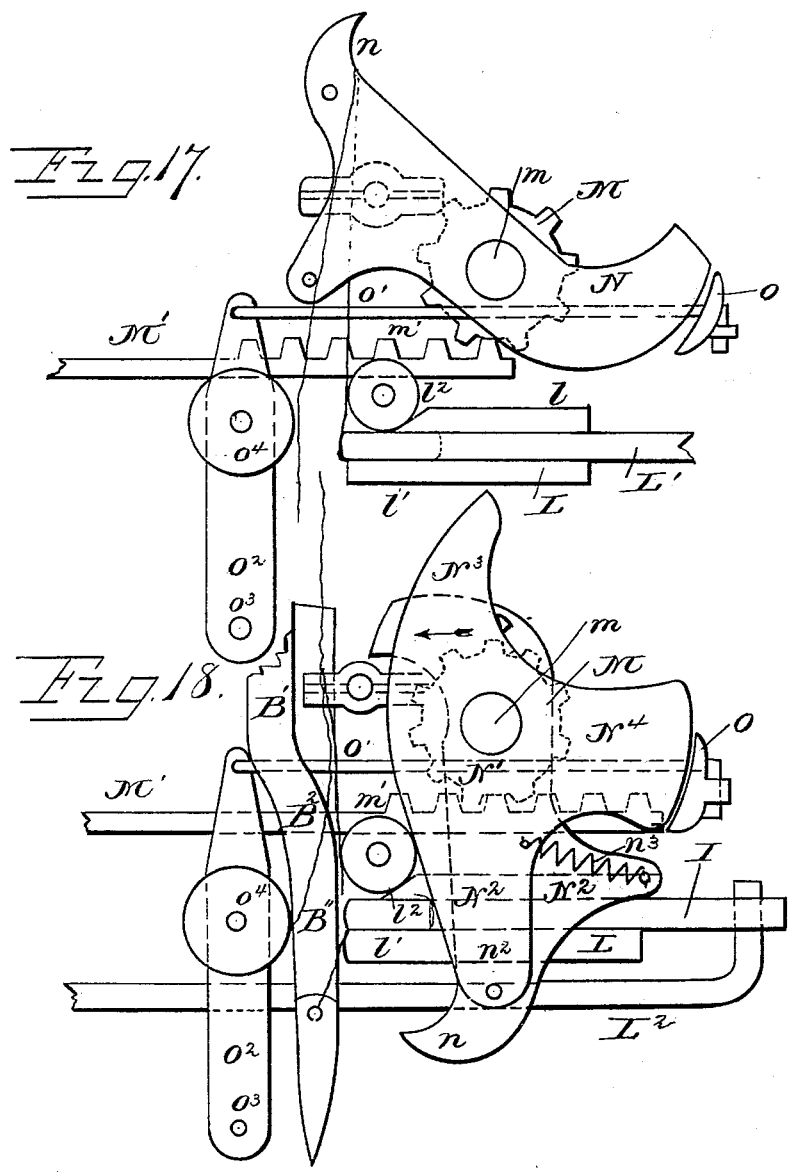
WITNESSES
INVENTOR
John F. Seiberling
by All. Smith
Attorney

UNITED STATES PATENT OFFICE.

JOHN F. SEIBERLING, OF AKRON, OHIO.

GRAIN-BINDING HARVESTER.

SPECIFICATION forming part of Letters Patent No. 269,332, dated December 19, 1882.

Application filed April 3, 1882. (Model.)

*To all whom it may concern:*

Be it known that I, JOHN F. SEIBERLING, of Akron, county of Summit, and State of Ohio, have invented new and useful Improvements in Grain-Binding Harvesters, of which the following is a full, clear, and exact description, reference being had to the accompanying drawings, making part of this specification, in which—

Figure 1:
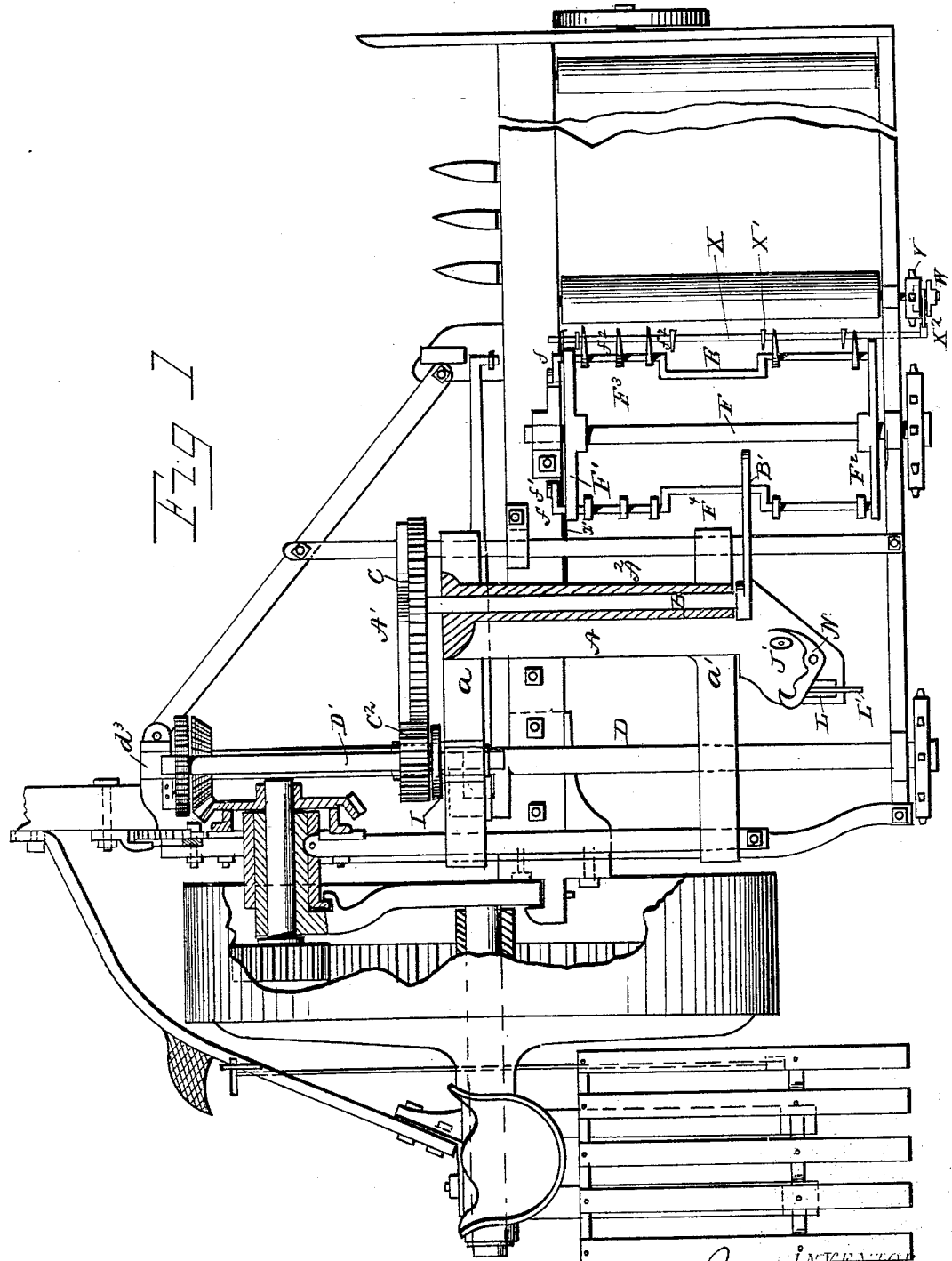
Figure 2:
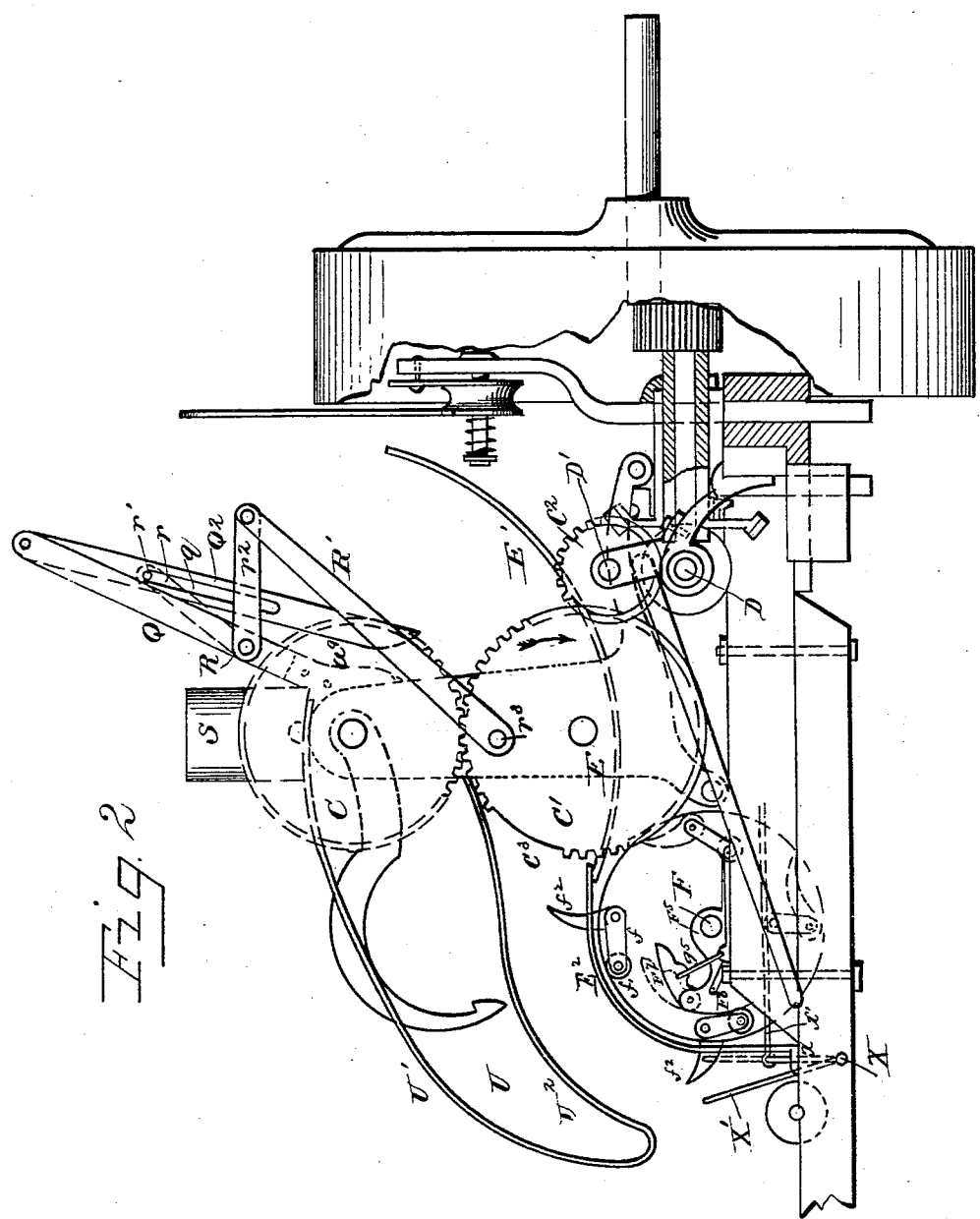
Figure 7:
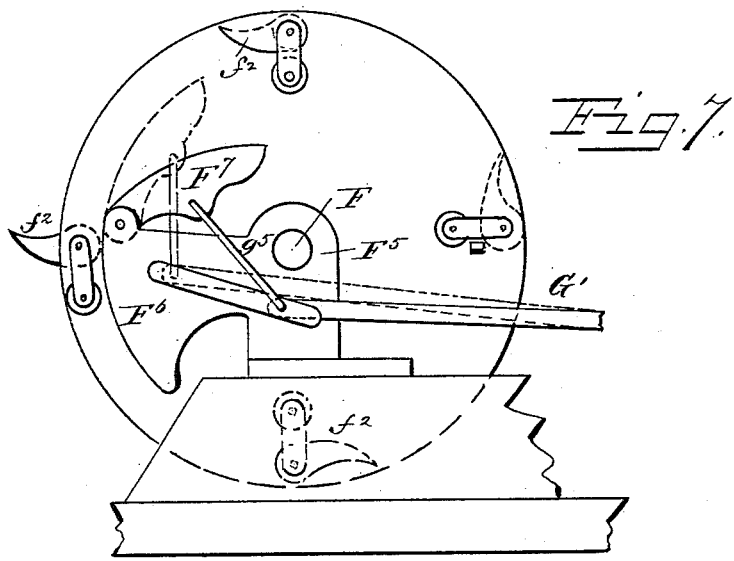
Figure 8:
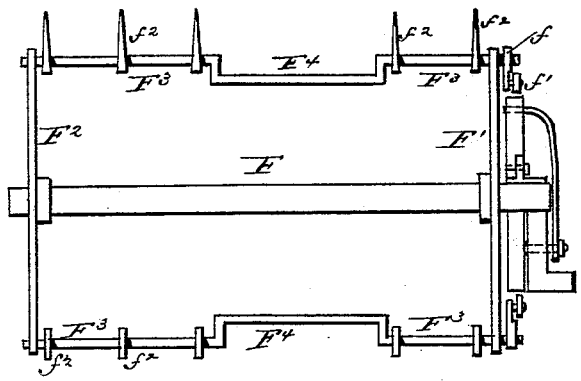
Figure 9:
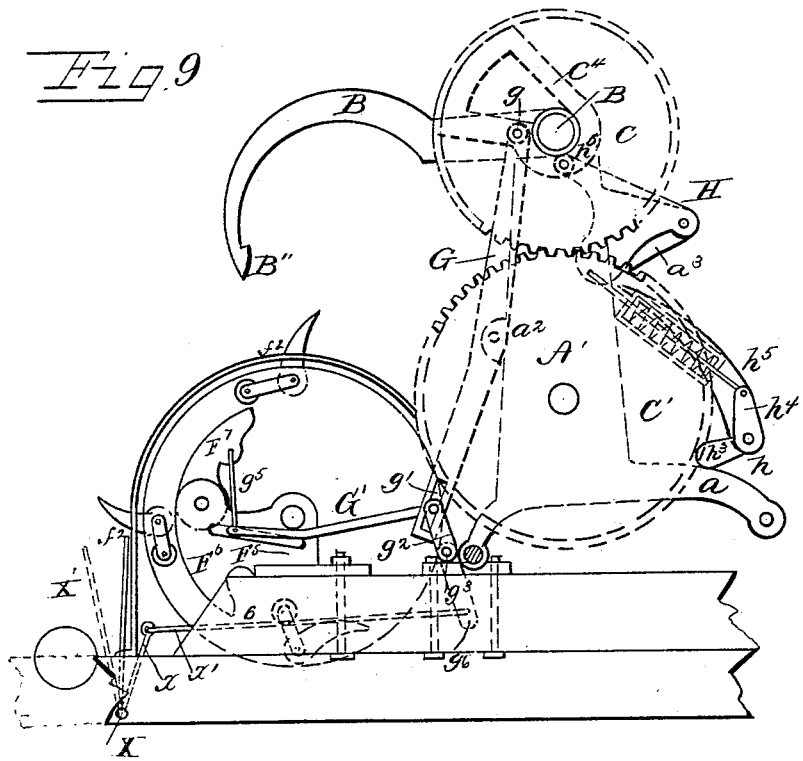
Figure 10:
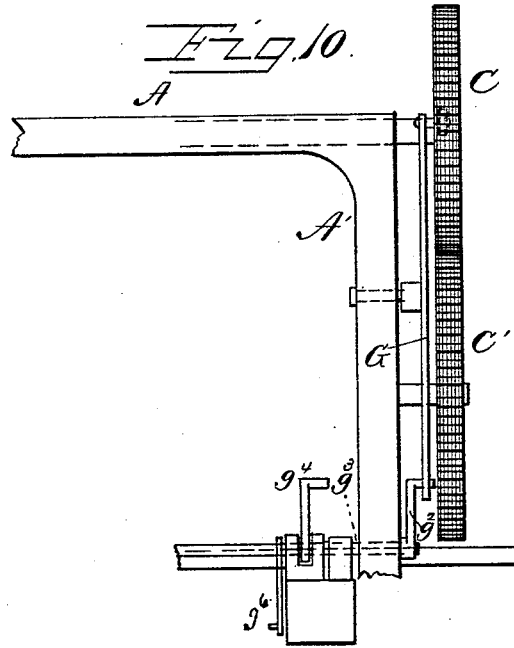

Figure 1 is a plan or top view of a harvesting-machine with my improvements applied, partly in section and partly broken away to show the arrangement of the parts. Fig. 2 is a front elevation, and Fig. 3 is a rear elevation, of the same, both partly in section and partly broken away. Fig. 4 is a vertical longitudinal section through the binder-frame. Fig. 5 is a side elevation of some of the parts shown in Fig. 4, (partly in section,) showing a modification in the construction. Fig. 6 is a rear elevation of the needle-arm and its attachments, compressor-hook cut-off, and knotter-hook and gear, showing their relation to the binder-table. Fig. 7 is a front elevation of the packer-cylinder, and Fig. 8 is a plan view of the same. Fig. 9 is a front elevation, showing the relation of the packer-cylinder to the needle-arm and the devices for controlling the action of the packers, and Fig. 10 is a side elevation of said devices in part. Figs. 11, 12, 13, and 19 are detail views of the cam-gear and ratchet-wheels and pawls hereinafter explained; and Figs. 14, 15, 16, 17, and 18 are similar views of the knotting mechanism.

My invention relates to the binding mechanism and to the devices connected therewith for delivering the grain thereto, compressing the same, and automatically throwing the raking, compressing, and binding mechanisms into and out of action, as hereinafter explained.

The construction of the harvesting-machine and the arrangement of the binding mechanism relative thereto and to the driving-wheel are described in another application, and will not therefore be described in detail here further than is necessary to an understanding of the improvements herein claimed.

The binding mechanism is shown located on the inner end of the platform and gear-frame between the grain or carrying platform and the main driving and supporting wheel, in close proximity to the latter, with the cutters about in the same vertical transverse plane with the main drive-wheel axle, or slightly in rear thereof, adapting the bound bundles to be discharged over the rear portion of said wheel; but it will be apparent from the following description that most of the features of improvement hereinafter described may be applied to other constructions of machines having a different arrangement of parts.

The binder-frame (indicated at A) is made in I-shape in plan view, the cross-bars having sleeves or eyes formed on their ends, which surround and slide on parallel longitudinal rods or rails supported in any suitable manner on the platform and gear-frame, adapting the binding mechanism supported thereon to be adjusted to suit the length or condition of the straw to be operated upon and bound, said binder-frame being arranged above and crossing the path of the pitman actuating the cutters, as shown. The forward end of this binder-frame has a gear-standard, A', formed on it, provided on its upper end with a horizontal arm, A², overhanging the sliding frame A, and having bearings, or made in the form of a sleeve, in which the shaft B, carrying the needle-arm B', is mounted.

Upon the forward end of the shaft B is secured a gear-wheel, C, to which motion is imparted from a gear, C', mounted on a stud-shaft on the standard A', and engaging with and receiving motion from a pinion, C², mounted loosely and sliding on a longitudinal shaft, D', geared to and receiving motion from the crank-shaft D. The latter is mounted in suitable bearings on the frame, and is connected with and driven by the main driving-wheel through an arrangement of gearing shown, or in any suitable manner. The shaft D has its forward bearing in a bracket on the harvester-frame, and at its rear end in a bearing on the forward cross-arm, $a$, of the sliding binder-frame, the sliding gear C² being coupled to said frame in any suitable manner, so as to move back and forth with it, and thus maintain its working relation to the gear C'. The gear-wheel C' is of slightly-greater diameter than the gear C, but is provided with the same number of teeth, with a break in the circle at $c^3$, forming a delay-surface, permitting the wheel C and the needle-arm to rest during the forming of the knot in the band, while at the same time serving to give one revolution of wheel C to each revolution of wheel C'.

Just over the binder-frame A, in rear of the standard A', is secured the slotted binder-table E, made by preference concave on its upper surface, conforming to the sweep of the needle-arm, and terminating at its inner side in an upwardly inclined or curved extension, E', up which the bundle, after it has been bound, is carried for discharging it over the rear portion of the driving-wheel, as hereinafter explained. The table E, being on the binder-frame, is adjustable backward and forward with said frame, and its outer edge, adjacent to the grain-carrying platform or apron, rests and slides freely under the inner adjacent edge of a slotted concavo-convex cover, $E^2$, which protects the elevating and packing cylinder or drum, said cover terminating at its lower outer end in close proximity with the inner platform-apron roller, and is secured by an angular foot to the platform-frame timbers. Underneath this arching cover $E^2$ is arranged a skeleton drum or cylinder, consisting of end disks, F' $F^2$, secured to a central shaft, F, and provided near their periphery with a series of rock-shafts, $F^3$, having crank-arms $f$ on their forward ends, provided with friction-rollers $f'$ for rocking them. These rods or shafts have also a crank portion at $F^4$, at or near midway of their length, bent inwardly for reducing the diameter of the cylinder at that point, and permitting the needle-arm to enter within the circle described by the rotation of the rods $F^3$, with the central shaft and end disks. The rods $F^3$ are provided on each side of the crank portion $F^4$, which is made long enough to accommodate the endwise movement of the binder mechanism, with elevating and packing teeth $f^2$, which pass through the slots in the cover $E^2$ and serve to pick up the grain as it is discharged by the platform-carrier, to elevate it over the drum and deposit it upon the concave or table E.

The shaft F of the packer-cylinder is provided on its lower end, as is also the inner platform-apron roller, with a sprocket-wheel, to which motion is imparted by an endless chain from a sprocket-wheel on the rear end of the crank-shaft (Shown in Fig. 1.)

The crank-arms $f$ on the rod or shafts $F^3$ are acted upon for throwing the lifting and packing fingers out into operative position by the fixed cam $F^6$, formed on the bracket or standard $F^5$, in which the forward end of shaft F has its bearing, as shown in Figs. 2, 7, 8, and 9; and to the upper heel end of this cam an extension-piece, $F^7$, is pivoted, adapting the crank-arms to hold the fingers out and causing them to crowd the grain back and compress it upon the table and against a compressor hook or arm, hereinafter described, except when the binding devices are in action, when the pivoted portion $F^7$ is withdrawn, as shown in Figs. 2 and 7, allowing the fingers to rock back within the slotted shield or cover after they have acted to lift the straw over the cylinder.

The devices for operating the pivoted portion $F^7$ of the cam $F^6$ consist of a lever, G, pivoted midway of its length in a lug, $a^2$, on the binder-gear standard A'. The upper end of the lever G is provided with a horizontal pin, carrying a friction-roller, $g$, working in a cam-groove, $C^4$, formed in the rear face of the gear-wheel C, and imparting a vibrating movement to the lever G. The lower end of the lever G has a slot, $g'$, formed in it, and a pin or wrist of a crank, $g^2$, on a rock-shaft, $g^3$, enters said slot in lever G, and is vibrated by the movement of said lever. The rock-shaft $g^3$ (see Fig. 10) has a second crank-arm, $g^4$, from which a rod, G', extends outward, its outer end being provided with a pin or wrist working in an inclined slot in the bearing-bracket $F^5$, and from said wrist or sliding outer end of rod G' a pivoted link, $g^5$, extends obliquely upward, and is there pivoted to the pivoted portion $F^7$ of the cam $F^6$.

The formation of the cam $C^4$ and its arrangement on the wheel C relatively to the needle-arm are such that as the latter is moved downward and inward for carrying the band under the grain to the knotting devices the cam-extension $F^7$ is dropped back and no longer holds the fingers $f^2$ up to their work of pressing the grain back upon the binder-table against a compressing hook or arm, $h'$. The arm (or arms) $h'$, against which the grain is packed by the fingers $f^2$, works up through a slot in the binder-table, and is rigidly connected with a rock-shaft, $h$, (see Figs. 3, 6, 9, and 11,) which also carries a cut-off in the form of a bent arm, $h^2$, set opposite to the compressing-arm $h'$. The shaft $h$ is brought into action by the pressure of the grain upon the arm $h'$, this action setting the binding mechanism in motion, as will be described.

Upon the shaft D', upon which the sliding pinion $C^2$ is mounted, is a disk, I, interposed between the pinion $C^2$ and the transverse bar $a$ of the binder-frame, and connected by a grooved collar with the latter, so as to move back and forth with it, said disk being also coupled to the loose sliding pinion $C^2$ in such manner that the latter slides with it on the shaft D'. The pinion $C^2$ may, if preferred, be mounted loosely on a sleeve of the disk I for adapting it to slide with the latter. The disk I is feathered to and turns with the shaft, and is provided with an internally-ratcheted rim, I', (see Figs. 11 and 12,) overhanging a pawl, $i$, pivoted to the rear adjacent face of the pinion $C^2$. The pawl $i$ is held in engagement with the ratchet for rotating the pinion by a spring, $i^2$, and is provided with a lever-extension, $i'$, overhanging the rear face of the gear C', and is operated for releasing the pawl $i$ from the ratchet-disk I as follows:

Upon the forward face of the standard A are two bars or arms, $I^2$ $I^3$, each pivoted at one end to said standard, with their swinging ends projecting on the side toward the pinion $C^2$ and connected by a link, $i^3$. The upper arm, $I^2$, has a slot, $i^4$, in its inner end, where it is pivoted to the standard A, said slot permitting an endwise movement on its pivot, and said end, resting in close proximity with the adjacent face of the wheel $C'$, is acted upon in each revolution of the latter by a cam-projection, $C^5$, on the latter, said cam crowding the arm $I^2$ outward toward the pinion $C^2$. The outer end of arm I is expanded somewhat in width at its outer face or end, $i^5$. The gears $C'$ and $C^2$ are so constructed that the latter makes two, three, or more complete revolutions to one of the wheel $C'$, which it drives, and so arranged or geared that at each revolution of wheel $C'$, as the arm $I^2$ is thrown outward by the cam $C^5$, the end $i^5$ is brought to bear upon the arm $i'$, throwing the pawl $i$ out of engagement with the ratchet I, releasing the pinion $C^2$ therefrom, thereby stopping the rotation of said pinion and of the wheel $C'$, and arresting the action of the binding mechanism connected with and driven by the latter.

The shaft $h$, to which the compressor arm or hook $h'$ is attached, is provided on its forward end with a horizontal arm or lever, $h^3$, (see Fig. 11,) arranged directly under the swinging end of the pivoted arm $I^3$, and as the grain is crowded back upon the binder table E against the arm $h'$ by the action of the packing-fingers $f^2$ the pressure of the grain, when sufficiently condensed, crowds the arm $h'$ outward, rocking the shaft $h$ sufficiently to raise the arm $h^3$, and with it the bar $I^3$, and the latter, acting through the link $i^3$, lifts the arm $I^2$ clear of the arm $i'$ of the pawl $i$, allowing the latter to engage the pinion $C^2$ with the ratchet-wheel I, thereby putting the binding mechanism in action, and the gear $C'$ makes one revolution, when the cam $C^5$, acting upon the arm $I^2$, again throws the pawl $i$ out of engagement. A spring, $i^6$, connected with the arm $I^2$ and standard $A'$, serves to withdraw the latter out of the way of the pawl-arm $i'$ when not forced out by the action of the cam $C^5$. The shaft $h$ has a second lever-arm, $h^4$, having a yielding or spring connection, $h^5$, (see Fig. 9,) with one arm of a bell-crank lever, H, pivoted in a lug, $a^3$, on the standard $A'$, the other arm of said lever being provided with a spur carrying a friction-roller, $h^6$, working in the cam-groove $C^4$ of the wheel C. By this arrangement the compressing hook or arm $h'$ is held up to the action of the grain with any desired force until, being rocked back by the pressure of the grain, it sets the binding mechanism in motion, when the cam-groove $C^4$, acting through the bell-crank H, serves to further rock the shaft $h$, carrying the arm $h'$ below the surface of the binder-table out of the path of the bundle being bound, and by the same movement of the shaft to rock the cut-off $h^2$ up behind said bundle and in front of the incoming grain.

The cam-groove $C^4$, acting upon the bell-crank H after the bundle has been carried past the binding devices and over the compressing hook or arm $h'$ by the needle-arm, in connection with the spring $h^5$, serves again to throw said compressing-arm up in front of the grain and to withdraw the cut-off $h^2$, allowing another bundle to accumulate on the binder-table.

The binder-frame A is provided with arms $a^4$ and $a^5$, projecting in rear of the cross-bar $a'$, the former, $a^4$, slightly below the plane of said cross-bar, and the latter, $a^5$, in angular form underneath $a^4$, said arms being provided with bearings for a vertical shaft, J, carrying the knotter or head $J'$. The shaft J has a bevel-gear, $J^2$, upon it, to which motion is imparted by a corresponding bevel-wheel, $J^3$, secured to the rear end of a horizontal shaft, $J^4$, (see Figs. 4 and 14,) which at its forward end is provided with a pinion, $J^5$, engaging with and receiving motion from an internal rack-segment, $C^9$, on the projecting rim of the gear-wheel $C'$. The shaft J is hollow, and has rigidly secured to its extreme upper end a cross head or hook, $J'$, to a heel-extension of which is pivoted a bar or movable lower jaw, $J''$, said jaw passing through a slot in the shaft J below the head $J'$, and also through a slot in the upper end of a rod, $j$, sliding therein. The rod $j$ extends down through the shaft J and below the lower bearing, $a^5$, therefor, and is provided on its lower end with a collar, $j'$. The arm or bearing-bracket $a^4$ is provided on its extreme rear end with a pendent arm, $a^6$, (see Fig. 4,) to the lower end of which is secured a flat spring, $k$, the forward end of which rests under the rod $j'$ or the collar J thereon, the tension of said spring being exerted to force the rod upward for closing the pivoted jaw $J''$ against the fixed jaw $J'$. The spring $k$ is provided near its forward end with an angular or hook-shaped piece, $k'$, which hooks over the collar $j'$; and secured to the spring $k$ or hook $k'$ is a standard, $k^2$, provided on its upper end with a friction-roller, $k^3$, resting in contact with the lower face of the bevel-wheel $J^2$. This bevel-wheel has a cam-shaped formation, $j^3$, on its lower face, which, once in each revolution of said wheel, acts on the friction-roller $k^3$, pressing it and the spring $k$ downward, causing the hook $k'$ to act on the collar $j'$ and draw the rod $j$ downward, depressing the pivoted jaw $J^4$ and separating it from the fixed jaw $J'$ to allow the ends of the bands to be passed between and caught by said jaws. The tension of the spring $k$ can be regulated by means of a spring and adjusting-nut on the lower end of a rod or bolt, $k^4$, pendent from the arm $a^4$, and passing through a perforation in the spring or, it may be, pivoted bar $k$.

Upon the bar $a^4$ is secured a longitudinally-grooved block, L, (see Figs. 15, 17, and 18,) the outer flange, $l$, of which is provided on its forward end with a cutting-edge, $l^2$, the inner flange, $l'$, serving as a fixed jaw of the cord-holder. A sliding hook-bar, L', moving in said grooved block, serves as the moving jaw. A hook or shoulder on the forward end of the sliding bar L' serves to grasp the cord from the passing needle-arm and to draw it into the fixed jaw or cord-holder l' and the knife l², the latter severing the band between the cord-holder and the knotter-head. The sliding bar L' has one end of a rod, L², pivoted to it, the other end of said rod being connected with one arm of a bell-crank lever, L³, the other arm of said lever being provided with a friction-roller l³, working in a cam-groove, C⁶, in the rear face of wheel C', adapted by its formation to impart a quick forward and return movement to the slide L' for causing the hook on the latter to move forward and grasp the band from the needle just after the latter has passed it, and to instantly draw back, carrying said band to the fixed jaw and cutter.

Just outside or in front of the grooved block L, relatively to the movement of the needle-arm B', is a vertical rock-shaft, $m$, mounted in bearings in arm $a^4$, and provided with a pinion, M, to which movement is imparted by a toothed rack, $m'$, on the rear end of a rod, M', which at its forward end is connected with one arm of a bell-crank lever, $m^2$, (see Fig. 4,) the outer arm of which is armed with a friction-roller, $m^3$, working in a cam-groove, C⁷, in the rear face of wheel C'. The cam C⁷ is formed or arranged to impart a rocking motion to the pinion M through rack $m'$ and its connections after the end of the cord has been cut and secured in the grasper and the needle has passed the latter in its rotation to receive another bundle. The shaft $m$ is provided on its upper end with a plate, N, arranged just above the plane of the knotter-head, and having on its outer end a curved hook, which, by a rocking movement of the shaft, is swung over the knotter hook or head from a position shown in Fig. 18 to that shown in Fig. 17, carrying the cord with it and placing it upon said head or hook in readiness for the action of the latter, and the hook $n$ is then retracted to the position shown in Fig. 18, taking it out of the path of needle-arm.

Upon the plate N is an irregularly-formed T-shaped stripper, N', pivoted by the inner end, N², of its cross-head to the curved arm $n$ at $n^2$, the forward cross-arm, N³, being curved on its forward face and overhanging the knotter-head J J''. The base or end N⁴ of this stripper rests in contact with a pivoted shoe-piece, O, moving in a slot in the bar $a^4$, and the stripper is held against said piece O by a spring, $n^3$, secured to it (the stripper) and to a rearwardly-projecting lug, $n^4$, on the plate N.

From the shoe-piece O or its pivotal support a rod, O', extends forward to a bar, O², which at the inner end, O³, is pivoted to a lug or ear on the bar $a^4$. This pivoted bar O² is provided near its forward end, to which rod O' is connected, with a friction-roller, O⁴, which is acted upon by an inclined cam-face at B² on the needle-arm, said cam serving to move the roller forward, and with it the swinging arm N³ of the plate N', moving said arm forward over the knotter-head and stripping the loop formed thereon from said head and over the ends of band held between the jaws J' and J'' thereof. The needle-arm, at its outer end, is curved in such manner that while the arm itself moves in front of the knotter-head the needle attached to its curved end will be projected under the knotter-hook, thereby causing it to lay the cord carried by it against said hook by the side of the portion of the cord previously placed there by the hook $n$, when, by a rotary movement from its forward end outward of said hook or head, the ends of the cord are wrapped thereon by a single revolution of the head. In this movement of the head the ends of the band are caught between the jaws, and being held by the latter, the movement forward of the stripper N³ slips the loop off the hook and completes the knot. The needle-arm is made in sickle form, the part representing the blade approximating a half-circle, and just where the latter joins the shank portion an arm, P, (or arms,) is pivoted, which is represented in its normal position in Fig. 6, being held in such position by a spring, $p^x$, or other suitable means for that purpose.

The bearing sleeve or arm A² is provided on its rear end with an arm, $a^8$, projecting obliquely downward and inward, and the heel end of the arm P is provided with a forwardly-projecting spur, carrying a friction-roller, $p$, which comes in contact with the end of said arm $a^8$, or with a projection thereon, just as the needle-arm approaches the upper end of the elevating-incline E', causing the arm P to lift the bundle out of the concavity of the needle-arm and incline shown in Fig. 3.

The standard A' and sleeve A² have lugs $a^9$ $a^{10}$ formed upon them, to which standards Q Q' are secured, set inclining toward the driving-wheel, as shown, and to the upper end of standard Q' is pivoted a pendent bar or arm, Q², with its lower end crossing the plane of the arm P when raised into the position indicated in Fig. 3 and just above the upper end of the incline E'. The arm Q² has a longitudinal slot, $q$, formed in it, a crank-wrist, $r'$, formed on one arm, $r$, of a double-cranked rock-shaft, R, working up and down therein for vibrating said arm Q². The rock-shaft R has its bearings in the standards Q Q', and is provided with a crank-arm, $r^2$ on its forward end, connected by a rod, R', with a crank-pin at $r^3$ on the forward face of the gear-wheel C'. By this arrangement, just as the arm P has lifted the bundle out of the needle-arm, the arm Q' is vibrated outward, thrusting the bundle from the arm and throwing it over the rear portion of the driving-wheel upon a bundle-carrier, described in another application.

In Fig. 4 a twine-box, S, is represented as supported upon the overhanging binder-frame arm A², with the cord or band material passing thence down through an eye in a pendent guiding-arm, T, said eye being arranged in line with the binder-arm shaft B, which is shown grooved longitudinally in its journal portions, resting in the bearings in arm $A^2$, the cord passing through said grooves, as indicated in Fig. 6, to the needle-arm.

In Fig. 5 the journal portions of the shaft are shown enlarged, the cord passing through grooves in such enlargements or collars. By this construction the cord is carried around by the shaft, and is thus prevented from wrapping it, and the necessity for drilling the shaft from end to end in order to carry the cord past the bearings of the needle-arm shaft is avoided. In Fig. 5 the twine-box is supported upon one of the bearing-lugs and the guiding-arm T is supported on the standard $A'$. The binder-arm shaft in said Fig. 5 is represented as being actuated by a crank-arm, $B^4$, to accommodate which and at the same time prevent the wrapping of the cord thereon it is passed first through the crank-wrist and thence through the shaft on its grooved journals.

U is a grain-shield, made in the form of an irregular elongated U turned upon its side, with its upper arm, $U'$, secured at its inner end to the sleeve or arm $A^2$ and overhanging the packer-cylinder cover $E^2$ and the outer portion of the table E adjacent thereto. The lower one, $U^2$, at its outer portion, overhanging the packing-cylinder, conforms in part to the circle described by the packer-teeth $f^2$, and serves to hold the grain to the action of the latter in raising the grain from the platform-carrier to the binder-table. The inner yielding end of said lower arm, overhanging the table E, serves to compress the grain as it is crowded inward on said table against the compressing arm or hook $h'$. The sprocket-wheel V on the rear end of the inner apron-roller shaft, and which is operated through an endless chain from a sprocket-wheel on the crank-shaft, as explained, is mounted loosely on its shaft, and is provided with an internally-ratcheted rim, $V'$, and a disk, W, fast on said roller-shaft, is provided with a pawl, $w$, pivoted to its forward face, adapted to engage with said ratcheted rim. The pawl $w$ is held in engagement with the ratchet $V'$ by a spring, $w^2$, and is provided with a lever-arm, $w'$, projecting beyond the periphery of the disk, for throwing the pawl out of engagement.

X is a rock-shaft arranged between the inner apron-roller and the slotted cover $E^2$ of the elevating and packing cylinder, connected through a crank-arm, $x$, and link $x'$ at its forward end with a pendent arm, $g^6$, on the rock-shaft $g^3$ in such manner that as the pivoted cam $F^7$ is rocked down to stop the packing action of the packers $f^2$ the shaft X will be rocked from its upper face outward, vibrating outward a series of vertical fingers $X'$, secured thereto. The rear end of the shaft X has a vertical arm, $X^2$, which by this rocking movement is thrown outward under the descending pawl-arm $w'$, and serves to disengage the apron-roller shaft from the sprocket-wheel V, stopping the action of the apron until the action of binding the bundle is completed, when, through the connection of the arm $X^2$ with the rock-shaft $g^3$, operated through devices connecting it with the binding mechanism, as above described, said arm is rocked from under the pawl-arm $w'$, permitting the pawl $w$ to again engage with the sprocket-wheel for actuating the apron-roller shaft. The arms or fingers $X'$, when rocked outward as explained, serve to hold any grain on the carrier-apron removed beyond the reach of the lifting and packing teeth $f^2$.

Having now described my invention, what I claim as new is—

1. The combination of the spur-pinion $C^2$, the ratchet-wheel I, the pawl $i$, the spur-wheel $C'$, provided with the cam-projection $C^5$, the sliding hinged piece $I^2$, adapted to be interposed between the pawl and cam-projection, and the compressor-shaft $h$, connected with piece $I^2$, for automatically stopping and starting the binder, substantially as described.

2. The compressor-arm $h'$ and the cut-off $h^2$, both rigidly connected with a common shaft, $h$, in combination with the cam $C^4$ and intermediate connecting devices for actuating said shaft, substantially as described.

3. The combination, with the adjustable binder-frame, of the slotted binder-table and packer-shield, the compressor-arm, the cut-off, the elevating packer-teeth working up through said table and shield, and the overhanging binder-arm shaft, with its binder-arm arranged and operating substantially as described.

4. The binder-arm shaft provided with holes or grooves in its journal portions only, for adapting the cord to be passed to the needle on the outside of the shaft.

5. The combination, with adjustable binder-frame, of the binder-arm shaft having grooved or perforated journals for the passage of the band to the binder-arm, a binder-arm upon one end and a driving-wheel on the opposite end of said shaft, and a band-carrier and guide, all secured to and adjustable with said binder frame.

6. The binder-arm, curved at its outer swinging end, in combination with the needle secured to said curved end, whereby the said arm is adapted to pass by the knotter-hook or head, and at the same time to carry the needle under said head, substantially as described.

7. The combination of the knot-stripper $N'$ and the incline or wedge on one side of the point of the needle for moving said stripper, substantially as described.

8. The hollow knotter-shaft provided with the fixed jaw, in combination with the slotted sliding rod passing through said shaft, a movable jaw pivoted to said fixed jaw and passing through the slot in and operated by said rod, and mechanism for actuating the latter, substantially as described.

9. The combination of the knotter-hook, the hollow shaft, the sliding rod passing through said shaft, the movable knotter-jaw passing through a slot in said sliding rod, the spring for closing said jaw, and the cam and roller for depressing the jaw, all arranged and operating substantially as described.

10. The combination, in a grain-binding harvester, of the grain table or receptacle located between the platform-carrier and the driving-wheel, the rotating packer located underneath said receptacle and operating to lift the grain from the platform-carrier and into said receptacle, the overhanging binder-arm shaft, and the grain-guard U, provided with the lower yielding compressor-arm $U^2$, located over the packer-teeth, substantially as described.

11. The packer-shafts provided with crank-arms, in combination with the fixed cam $F^6$ and the pivoted extension $F^7$ of the latter, for holding the packer-teeth up to their work in forming the bundle and allowing them to drop back without packing the grain while the bundle is being bound, substantially as described.

12. The rocking packer-shafts provided with the inwardly-bent crank portions, allowing the point of the needle-arm to pass within the circle in which said shafts move, substantially as described.

13. The hinged cam-piece $F^7$, in combination with the rod $g^5$, the slotted standard $F^5$, the rod $G'$, and the crank-shaft $g^3$ for operating the same, substantially as described.

14. The crank-shaft $g^3$, provided with the crank-arms $g^2$, in combination with lever G, connecting it with the cam-groove $C^4$, the cam-extension $F^7$, and intermediate connecting devices for operating said extension, substantially as described.

15. In combination with a carrying-platform and packers for moving the grain therefrom to the binder-table, a cut-off independent of said packers, arranged to hold the grain on said platform and prevent its reaching the packer-teeth while the binding mechanism is in operation, substantially as described.

16. The combination of the packer, the carrying-platform, the cut-off between the packers and platform, arranged to work automatically simultaneously with the stopping of the platform, substantially as described.

17. The combination of the cut-off shaft, the arm $X^2$ on the end thereof, the pawl V, and the ratchet-wheel W for automatically stopping and starting the platform-rake when the cut-off is operated, substantially as described.

18. The combination, with the platform apron or carrier and a packing mechanism located at the inner end thereof for taking the grain from said carrier and delivering it to the binding mechanism, of a cut-off interposed between said carrier and packing mechanism, connected with the binding mechanism, substantially as described, whereby its movements are timed to those of the binding mechanism for preventing the grain from reaching and being acted upon by the packers when the binding mechanism is operated to bind a bundle.

19. The combination of the cut-off shaft, the crank X on the end thereof, the connecting-rod $X'$, and the cam $C^4$ with connecting devices, substantially as described, for automatically rocking said cut-off shaft at proper intervals.

In testimony whereof I have hereunto set my hand this 29th day of March, A. D. 1882.

JOHN F. SEIBERLING.

Witnesses:
FRANK A. SEIBERLING,
H. M. HOUSER.